(No Model.)
J. T. McNORTON.
CORN AND COTTON PLANTER.
No. 345,389. Patented July 13, 1886.
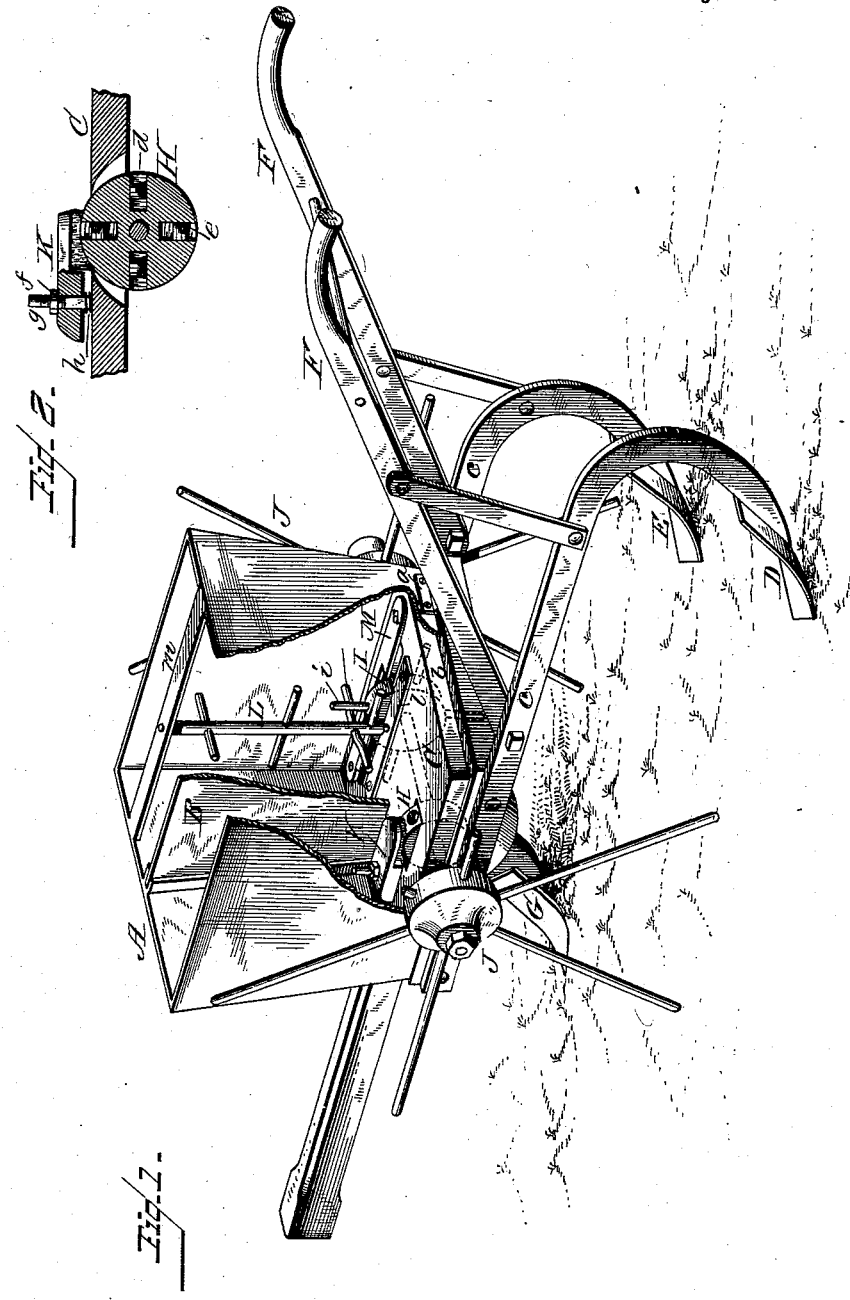
Witnesses
Inventor
John T. McNorton
By his Attorney

UNITED STATES PATENT OFFICE.

JOHN T. McNORTON, OF BURNET, TEXAS.

CORN AND COTTON PLANTER.

SPECIFICATION forming part of Letters Patent No. 345,389, dated July 13, 1886.

Application filed December 18, 1885. Serial No. 186,023. (No model.)

*To all whom it may concern:*

Be it known that I, JOHN T. MCNORTON, a citizen of the United States, residing at Burnet, in the county of Burnet and State of Texas, have invented certain new and useful Improvements in Corn and Cotton Planters; and I do hereby declare that the following is a full, clear, and exact description of the same, reference being had to the annexed drawings, making a part of this specification, and to the letters and figures of reference marked thereon.

Figure 1 of the drawings is a perspective view of my invention, with the hopper partly broken away to show the interior thereof; and Fig. 2, a detail sectional view of the pockets, disk, and brush.

The object of the present invention is to provide a simple and practically-operating corn and cotton planter; and it consists in the several details of construction, substantially as shown in the drawings, and hereinafter described and claimed.

In the accompanying drawings, A represents the hopper, divided into two separate compartments by the removable partition B, said hopper being hinged at its rear side to a platform, C, as shown at $a$. The platform C forms the bottom of the hopper A, and is rabbeted around its edge, as shown at $b$, to form a seat for the lower rim of the hopper, and insure a tight joint between it and the platform. The hinging of the hopper A admits of its being thrown back when the interior thereof needs cleaning, and when down in place it is held to the platform C by any fastening device found most preferable.

To the platform C are attached the beams $c$ of suitable plows, D E, provided with handles F, and forward of these is the plow or shovel G for opening the furrow, these shovels being of the usual form and construction.

The platform C, which forms the bottom of the hopper A, has elongated slots therein, through which project the periphery of disks H I, said disks being keyed or otherwise rigidly secured to a revolving axle, upon the ends of which are secured rimless wheels J, by which the shaft is given a rotary motion.

The disk H has pockets $d$ to receive and discharge the corn, the capacity of the pockets being regulated by adjustable bottoms $e$.

To the upper side of the platform C, I connect a brush, K, which is located directly over the periphery of the disk, as shown more clearly in Fig. 2. This brush is both removable and vertically adjustable, so that it can be replaced by a new one or adjusted to compensate for wear, said adjustment being attained by means of the regulating-nut $f$ upon the screw-threaded end of the stationary bolt $g$ and the spring $h$. Any suitable means, however, may be employed for rendering the brush both removable and adjustable.

The disk I is provided with pins $i$, which are brought successively against arms $k$ of an agitator, L, said agitator having its bearing at its lower end in a plate, $l$, secured to the platform C, and its upper or opposite end in a longitudinal brace, $m$, at the upper part of the hopper A. The upper end of the agitator L is permanently connected to the brace $m$, but its lower end simply rests in a mortise or hole in the bearing-plate $l$. Thus when the hopper A is thrown back the agitator is carried with it. A laterally-adjustable gage-plate, M, is connected to the platform C, to regulate the quantity of seed discharged.

When planting corn, the partition B is employed, and when planting cotton the partition is removed, so as to have the entire capacity of the hopper, the cotton-seed being such as not to pass through or be distributed by the disk H.

The purpose of the brush K is to keep the periphery of the disk H free from corn adhering thereto, also to regulate the quantity carried around by the pockets $d$ by brushing the corn level with the periphery.

Having now fully described my invention, what I claim as new, and desire to secure by Letters Patent, is—

1. In a corn and cotton planter, a hinged hopper provided with a removable partition and an agitator, in combination with a platform to serve as a bottom to the hopper, and two revolving disks, one provided with pins for operating the agitator when cotton-seed is to be sown and the other disk having pockets to receive the corn when used as a planter, substantially as and for the purpose set forth.

2. In a corn and cotton planter, a hinged hopper provided with a removable partition and an agitator connected at one end to a longitudinal brace on said hopper, in combination with a platform rabbeted, as shown, and formed with slots, disks working in the slots, one of which is provided with pins to operate the agitator and the other disk having pockets, substantially as and for the purpose specified.

In testimony that I claim the above I have hereunto subscribed my name in the presence of witnesses.

J. T. McNORTON.

Witnesses:
GEO. R. L. MEHERVILLE,
W. WHIPLETT,
V. W. TROTTER.

Correction in Letters Patent No. 345,389.

It is hereby certified that Letters Patent No. 345,389, granted July 13, 1886, upon the application of John T. McNorton, of Burnet, Texas, for an improvement in "Corn and Cotton Planters," was erroneously issued to said McNorton instead of to Jasper Alvin Brooks, of same place, assignee of the entire interest in said invention; that the proper correction has been made in the files and records of the case in the Patent Office, and should be read in the Letters Patent to make it conform thereto.

Signed, countersigned, and sealed this 20th day of July, A. D. 1886.

[SEAL.]

H. L. MULDROW,
*Acting Secretary of the Interior.*

Countersigned:
    M. V. MONTGOMERY,
        *Commissioner of Patents.*